United States Patent [19]

Eliot

[11] E Re. 29,606

[45] Reissued Apr. 11, 1978

[54] SCRAP RECLAMATION

[75] Inventor: Sigdon A. Eliot, Worthington, Ohio

[73] Assignee: Thermetics, Inc., Worthington, Ohio

[21] Appl. No.: 459,127

[22] Filed: Apr. 8, 1974

Related U.S. Patent Documents

Reissue of:

[64] Patent No.: 3,656,735
Issued: Apr. 18, 1972
Appl. No.: 803,729
Filed: Mar. 3, 1969

[51] Int. Cl.[2] ..... C21B 7/00

[52] U.S. Cl. ..... 100/92; 29/403

[58] Field of Search ..... 29/403; 266/2 R, 5 R, 266/33 R, 33 S; 425/DIG. 46; 75/63, 65 R; 110/7 R, 7 S, 14; 427/226; 134/2, 19, 65

[56] References Cited

U.S. PATENT DOCUMENTS

| | | | |
|---|---|---|---|
| 958,623 | 5/1910 | Glass | 75/3 |
| 1,526,400 | 2/1925 | Waldmann | 75/44 R |
| 1,980,130 | 11/1934 | Fasting | 75/3 |
| 2,198,612 | 4/1940 | Hardy | 264/111 X |
| 2,343,336 | 3/1944 | Somes | 75/65 R |
| 2,446,637 | 8/1948 | Crampton et al. | 75/65 R |
| 2,792,298 | 5/1957 | Freeman | 75/3 |
| 2,852,408 | 9/1958 | Brother et al. | 427/372 X |
| 2,852,418 | 9/1958 | MacDonald | 134/65 X |
| 2,925,821 | 2/1960 | MacDonald | 134/65 |
| 2,977,631 | 4/1961 | Komarek et al. | 264/111 |
| 3,098,261 | 7/1963 | Littley et al. | 264/111 X |
| 3,163,929 | 1/1965 | Goodstein | 29/403 |
| 3,234,010 | 2/1966 | Mahony | 266/33 R X |
| 3,346,417 | 10/1967 | Ehrlich | 75/65 R X |
| 3,353,215 | 11/1967 | Haller | 425/78 |
| 3,510,563 | 5/1970 | Hall | 266/33 R X |
| 3,564,699 | 2/1971 | Moore | 29/403 |
| 3,567,201 | 3/1971 | Beckett | 266/33 S |
| 3,598,649 | 8/1971 | Juhasz | 134/2 |
| 3,627,288 | 12/1971 | MacDonald | 134/65 X |

*Primary Examiner*—C.W. Lanham
*Assistant Examiner*—V. Rising
*Attorney, Agent, or Firm*—Jerome R. Cox

[57] ABSTRACT

A system for removing oil, water and other adulterants from machine shop scrap cuttings. Scrap is inserted in the upper end of an inclined tumbler barrel and passed through a counterflowing stream of hot gases from a burner located at the lower end. Oxygen is inserted into the tumbler barrel at an intermediate position. The barrel is lined with refractory inserts each having contiguous connecting passages of different diameters. The scrap is raised to a temperature near its melting point and compacted into briquettes while remaining hot. Excess fuel gas flow and combustion prevent the aspiration of air into the barrel and thus prevent oxidation of the metal part of the scrap. As an alternative, the scrap can be melted as it flows from the tumbler barrel directly into a melting pot.

12 Claims, 5 Drawing Figures

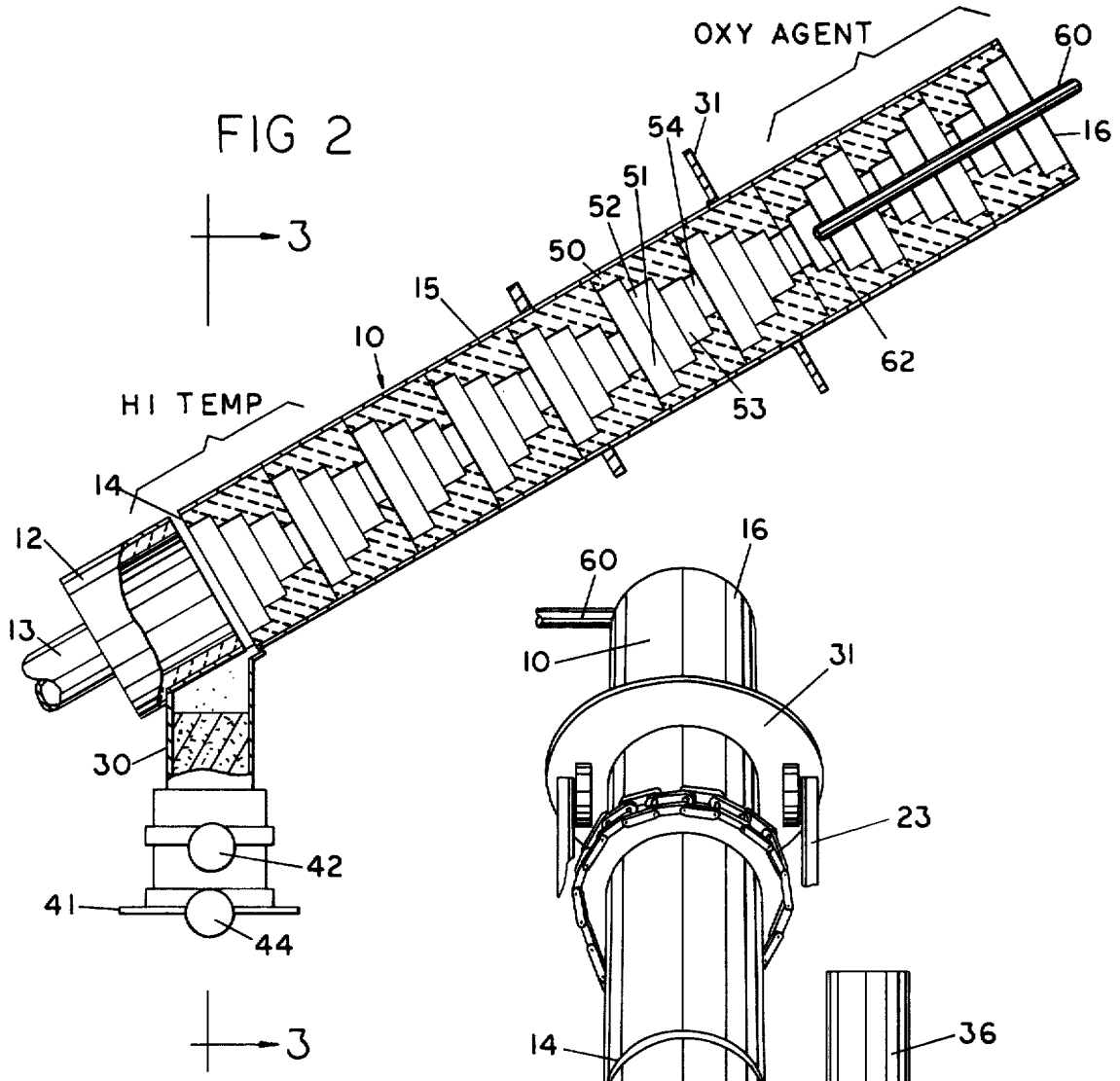
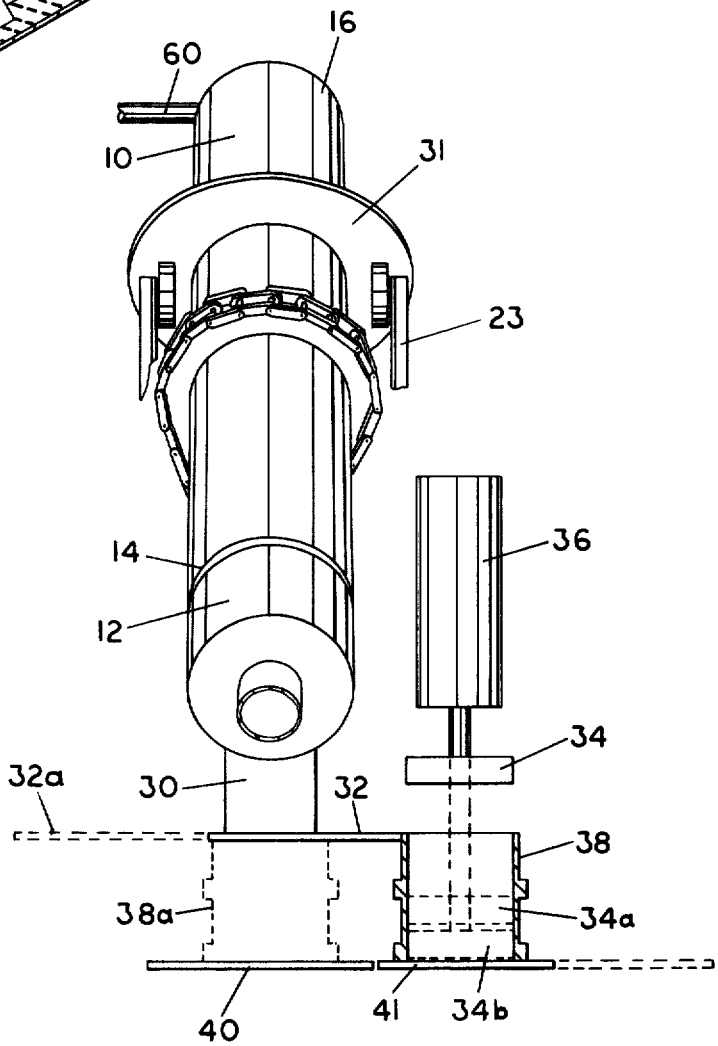
FIG 3

SCRAP RECLAMATION

Matter enclosed in heavy brackets [ ] appears in the original patent but forms no part of this reissue specification; matter printed in italics indicates the additions made by reissue.

BACKGROUND OF THE INVENTION

This invention relates to the reclamation of raw metal from machine shop scrap and more particularly relates to heating such scrap in a rotating tumbler barrel to promote the oxidation and vaporization of water, oil and other adulterants from machine shop cuttings.

In foundries and machine shops, metal cuttings are produced during boring, milling, and other operations. Water and various oils, which are used in performing these operations, adhere to the scrap cuttings. The type of scrap obtained from these operations is herein collectively referred to as chips. The water, oil, and other materials which adhere to the chips are collectively referred to as adulterants. It is the broad purpose of my invention to separate the adulterants from the chips and to recover suitably pure metal for further processing and reuse.

A known way of cleaning the adjulterants from the chips is to heat the chips to a temperature which is sufficient to vaporize some adulterants and promote the oxidation of others. This has conveniently been done by passing the chips through a rotating tumbler barrel which is inclined somewhat to the horizontal. Chips are fed into the upper end of the tumbler barrel and are tumbled with the aid of gravity to the lower end of the barrel. A burner is located at the lower end of the barrel which passes hot gases over the chips and heats them. Conventionally, after the heat has effected the necessary vaporization and oxidation, the chips are cooled until such time as they are to be melted and reused.

There are several problems and inefficiencies present in the above system. Often they arise because designers are forced to make trade-offs and compromises between various design factors.

The first problem is the oxidation of the chip metal itself. Although oxidation of the adulterants is desirable, oxidation of the chips produces corrosive losses and impedes melting. Designers of heretofore known systems have had two options. They could heat the chips in an oxygen free atmosphere and thereby prevent chip oxidation. Obviously, this inhibits the desirable oxidation of the adulterants. In the alternative, designers could heat the chips in the presence of oxygen if the chips were not heated unacceptably hot to a temperature at which they readily oxidize. For example, bronze chips heated to 400° F. will not substantially oxidize while at the same time adulterants will vaporize and oxidize. However, it is clear that the production rate could be greatly increased if a way were found to permit heating of the chips to a temperature nearer their melting point, which for some types of bronze is approximately 1,800° F., without producing significant oxidation of the metal.

One solution, offered by MacDonald in U.S. Pat. No. 2,852,418 is to introduce the chips, the combustion fuel and some excess air all into the tumbler barrel at its upper end. These components must be properly proportioned so that the oxygen in the air is consumed by oxidation of the adulterants before the chip metal becomes hot enough to substantially and readily oxidize. This system unfortunately results in an inefficient and costly use of fuel. As combustion gases and chips move toward the lower outlet end of the barrel, the gases are cooled and the chips are heated. The chips in this inefficient system are never elevated to the temperature of the burner flame. The combustion gases are emitted into the atmosphere from the lower end of the barrel when they are at the same temperature as that to which the chips are raised, thereby wasting a significant portion of the heat capacity of the fuel.

If a counterflow principle were used in the MacDonald system so that the chips entered the upper end of the tumbler barrel and the fuel and excess air entered the lower end, fuel use would be more efficient because the combustion gases would leave the barrel from its upper end at a lower temperature. However, the chips would then be hottest and therefore most likely to oxidize where the excess air was the most abundant; that is, at the lower end where the air was introduced into the barrel.

Another problem with the above described counterflow system is that, even if the excess air were not intentionally introduced, air would be drawn into or aspirated into the tumbler barrel where the stationary burner abuts the rotating tumbler barrel.

Conventionally, cleaned chips, after being emitted from the tumbler barrel, are cooled and stored in bins. When stored as chips, substantial oxidation often occurs because with a mass of chips a large surface area of metal is exposed to air contact. The presence of oxide on the chip surfaces tends to act as an insulator between chips and inhibit melting of the chips. Even if the oxide were not present, heat conduction through a mass of chips is poor because of the small area of contact between chips and the large quantity of air between the chips.

Finally, it is very inefficient to heat chips for cleaning purposes, then cool them, and then reheat them in the melting process.

It is therefore an object of my invention to provide an improved method and apparatus for cleaning and preparing scrap metal for reuse.

Another object of my invention is to permit in one system the use of the efficient counterflow system of heating chips in a tumbler barrel, the introduction of an oxidizing agent into the barrel and the raising of the chips to a temperature near their melting temperature in the absence of oxygen.

Another object of my invention is to prevent the aspiration of air into a tumbler barrel at the connection of a burner to the barrel.

Another object of my invention is to eliminate the oxidation of cleaned chips and to facilitate the subsequent melting of cleaned chips.

Another object of my invention is to use most efficiently the heat capacity of the heating fuel.

Still another object of my invention is to provide a tumbler barrel which has interior walls which uniformly distribute the tumbling chips within the gas passing through the barrel.

Further objects and features of my invention will be apparent from the following specification and claims when considered in connection with the accompanying drawings illustrating several embodiments of my invention.

SUMMARY OF THE INVENTION

I have found that the preceding and other objects may be attained by raising the temperature of adulterated chips to a temperature in the range extending from a temperature sufficient to vaporize and oxidize adulterants to a temperature which is appreciably higher but still below the melting point of the chip metal and then either introducing the chips into a melting pot or compacting the chips into briquettes. As used in the next preceding sentence and hereinafter in this specification and in the claims, "melting point of the chip metal" and "melting temperature" are defined as the start of melting of the chip metal. In other words, regardless of composition of the chips, in referring to "melting temperature" or "melting point," Applicant is referring to the temperature at which the first liquid is formed within any metal particle thereof as its temperature rises.

Suitable apparatus for performing the above process includes an inclined rotating tumbler barrel, a fluid fuel burner at the lower end of the barrel, and either a plunger and mating cylinder for compacting the chips or a refractory container positioned beneath the lower end of the barrel which heats the chips to the melting point. It is helpful to introduce oxygen into the tumbler at an intermediate position.

DESCRIPTION OF THE VIEWS

FIG. 2 is a view in vertical section of the embodiment illustrated in FIG. 1 taken substantially along the line 2—2 of FIG. 1.

FIG. 3 is a view in vertical elevation of the end of the tumbler barrel of the embodiment of FIG. 1 and FIG. 2 but showing a part of the tumbler barrel and the preferred compactor in a vertical section taken substantially along the line 3—3 of FIG. 2.

Figure 1:
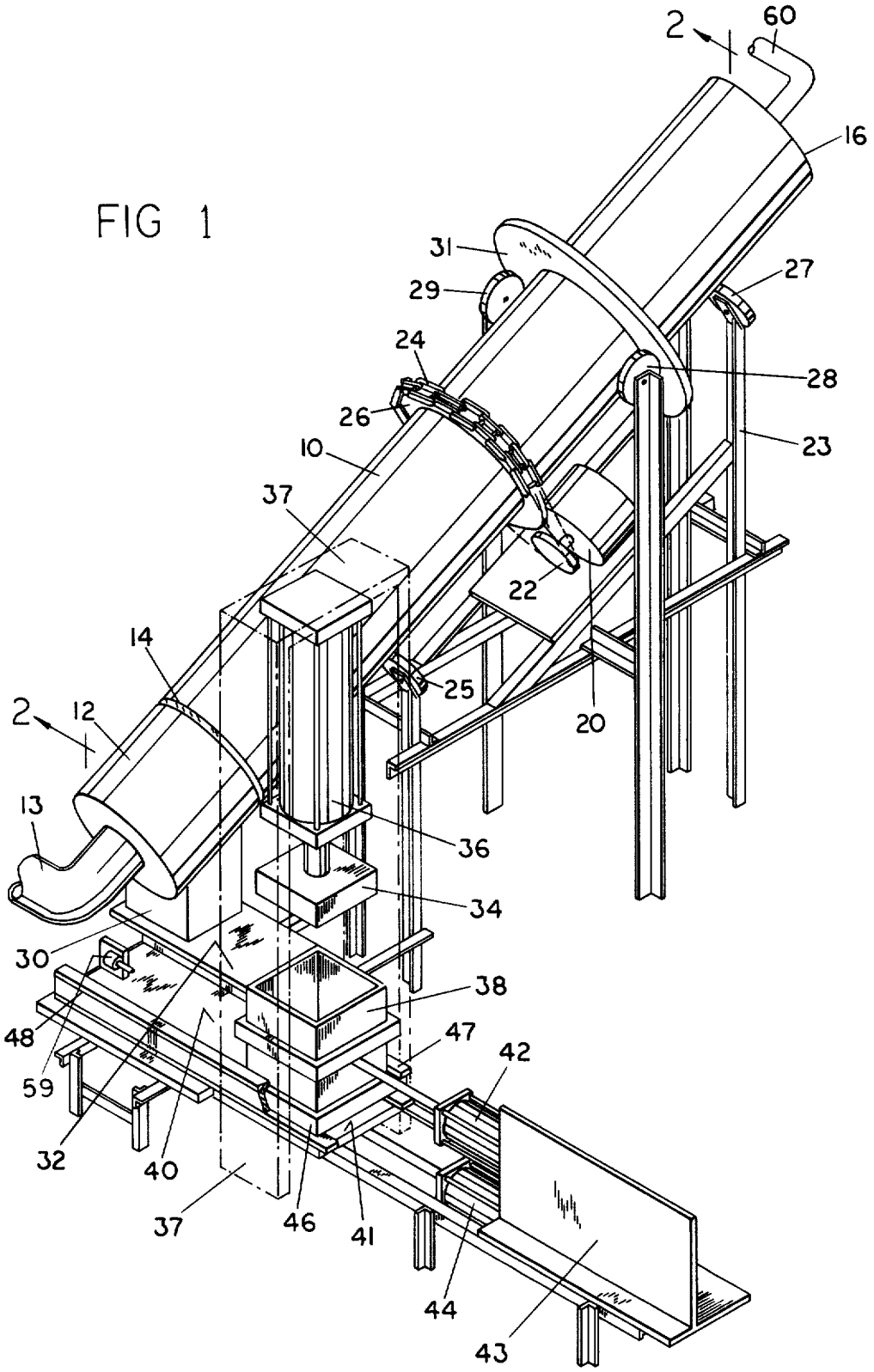
FIG. 1 is a view in perspective of the preferred embodiment of my invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

FIGS. 1-3 show different views of the preferred embodiments of my invention. The following description and reference numerals refer to all three figures. I first describe the apparatus generally and subsequently in more detail.

A rotatable tumbler barrel 10 is shown through which the chips pass as they are heated. The chips are heated by gases from a burner 12 positioned at the lower end 14 of the barrel 10. The burner 12 is aligned with but formed separately from the tumbler barrel 10. It does not rotate with the rotation of the barrel 10. A fuel mixture is fed into the burner by a pipe 13. The barrel 10 is inclined to the horizontal to facilitate passage of chips from its higher end 16 to its lower end 14.

The barrel 10 is rotatably driven by a suitably geared electric motor 20, a sprocket wheel 22 fixed to the motor shaft, a drive chain 24 and a sprocket wheel 26 welded to the tumbler barrel 10. The barrel 10 is supported by six rollers which are rotatably mounted to a support frame 23. Two rollers 25 and 27 and two symmetricaly positioned rollers (not shown) seat against the underside of the tumbler barrel 10 and support it. An annular flange 31 is welded to the barrel 10 and seats against another pair of rollers 28 and 29. The rollers 28 and 29, together with the annular flange 31 prevent the barrel 10 from slipping down its incline during rotation.

The burner 12 has an opening in its underside and has a hopper 30 fixed to and aligned with the opening. Cleaned chips may fall into and collect in the hopper after passage through the barrel 10. A platform 32 sealingly and slidably engages the otherwise open bottom of the hopper 30.

A compactor is provided to compress and compact the cleaned chips to form a briquette. The compactor comprises a plunger 34, driven by a pneumatic cylinder 36, and a mating compacting cylinder 38 into which chips are dumped and then compacted. The hydraulic cylinder 36 is supported above the compacting cylinder 38 by an inverted U-shaped support 37 which is shown in phantom.

The details of the tumbler barrel 10 are shown in FIG. 2. The barrel 10 comprises a tubular metal shell 15 which contains a series of identical ceramic inserts such as the insert 50. The inserts snugly fit within the barrel 10 and are positioned end-to-end in order to form a continuous, ceramic lined passageway through the barrel 10.

Each ceramic insert is formed with a plurality of cylindrical contiguous, connecting passages. For example, the insert 50 has a largest cylindrical passage 51, an intermediate cylindrical passage 52, and a smallest cylindrical passage 53. I prefer that these three passages 51, 52, and 53 be co-axial. A fourth passage 54 is provided which can be of any suitable shape but is preferably off center. The inserts are positioned in the barrel so that their off center passages are misaligned. This provides a somewhat tortuous path through the interior of the barrel. The purpose of the tortuous path is to create resistance to the flow of hot gases through the barrel 10 and to increase the turbulence of the gases and thereby improve the heat transfer to the chips. Those inserts at the upper chip receivng end 16 of the barrel 10 are positioned with their largest internal passage nearest the upper end 16 of the barrel. The remaining inserts have their largest passage nearest the lower end. The purpose of this alignment is to facilitate the receipt of chips at the upper end while compensating for the cntraction of the hot gases at the lower end as the gases move upwardly and cool.

The reason that each insert has passages of different diameters is to more evenly distribute the chips within the gas flowing through the barrel 10. This distribution is accomplished because the centrifugal force exerted by a particle, during rotation of the barrel 10, is proportional to the radius of its circular path. As the barrel rotates, a chip particle will fall through the hot gases when the vertical component of the centrifugal force is exceeded by the force of gravity on the chip. Different diameters produce different centrifugal forces and therefore different angular positions at which the chips fall from the interior wall of the barrel.

As an equivalent alternative, the inserts might have internal walls which continuously vary rather than vary in steps. For example, the interior walls might have a frusto-conical configuration.

A tube 60 extends into the upper end 16 of the barrel 10 and is provided for inserting an oxidizing agent into the barrel 10 at a position intermediate the ends of the barrel 10. For example, oxygen can be sprayed from an orifice 62 at the inside end of the tube 60. Its operation is explained below.

The preferred burner 12 is simply a ceramic lined burner tube supplied with a fuel mixture, preferably a hydrocarbon fluid, through a pipe 13. However, a rectangular segment has been removed from the bottom of the burner tube to provide an exit means for removing chips from the barrel. The exit means includes a hopper 30 which is a container for receiving, through the open bottom of the burner tube, chips which have passed through the barrel 10. The hopper 30 is connected to the burner 12 so that it will collect the chips and will store them in an oxygen free atmosphere. As explained more fully below, the burner 12 is operated so that the gas pressure in the burner 12 and at the lower end 14 of the barrel 10 is greater than atmospheric pressure. This assures that no atmospheric oxygen can enter the hopper 30.

The hopper 30 has an open bottom which is closed by a platform 32 which conforms to the open bottom of the hopper 30 and thereby sealingly engages it. The platform 32 seals the bottom of the hopper 30 so that chips may collect in the hopper 30, but the platform can be slidingly moved to release the chips into the compacting cylinder 38 to which it is attached. The compacting cylinder 38 which I prefer, is a square steel box with an open bottom and an open top. I prefer that the box have a slight taper enlarging toward the bottom to facilitate briquette removal. The compacting cylinder 38 is slidable along a table 40 which conforms to the bottom of the compacting cylinder 38 and thereby sealingly engages it. A flange 46 is provided around the bottom edge of the compacting cylinder 38. The flange 46 rides along track members 47 and 48 as it is slid along the tube 40 by a pneumatic cylinder 42. Of course hydraulic cylinders, magnetic solenoid systems, or a mechanical system could be substituted for the pneumatic cylinders used herein.

By the force of the pneumatic cylinder 42, which is mounted to a plate 43, the compacting cylinder 38 can be slid along the table, the platform 32 moving with it to maintain its sealing relationship with the bottom of the hopper, until the compacting cylinder 38 moves beneath the hopper 30. When this occurs, the charge of chips in the hopper 30 falls into the compacting cylinder 38 and the compacting cylinder 38 is then returned to its original position by the pneumatic cylinder 42. The position of the compacting cylinder 38 for receiving chips from the hopper 30 is illustrated in phantom in FIG. 3 at 38a.

The table 40 is provided with a removable panel 41 which can be withdrawn from beneath the compacting cylinder 38 by a pneumatic cylinder 44 mounted to the plate 43. This permits ejection of a briquette from the compacting cylinder 38 by the plunger 34. The table is supported by a suitable frame.

It should be noted that I use the term cylinder in the mathematical sense when describing the compacting cylinder 38. That is, a cylinder is a body having an internal surface generated by a straight line called a generatrix moved around a polygon while maintained parallel to another straight line. Thus, a circular, square, octagonal, etc. cylinder could be used with a mating plunger to compact the hot chips.

Figure 4:
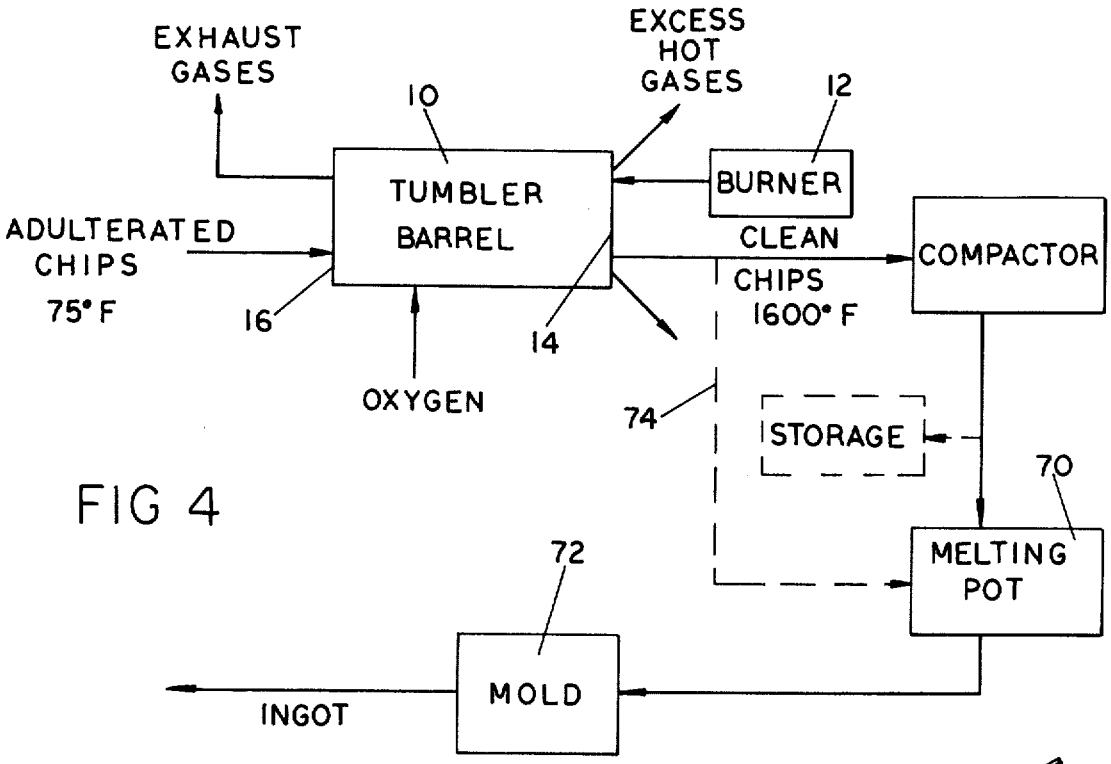
FIG. 4 is a diagrammatic view illustrating preferred embodiments of the process of my invention.

The operation of the above described apparatus is preferably in conformity with my method illustrated in FIG. 4. In describing the operation, reference is made to FIGS. 1–4.

Adulterated chips, at room temperature, are fed into the upper end 16 of the tumbler barrel 10 while the barrel is rotated for example, at 90 r.p.m. Although various continuous feed systems are available, I prefer an augur feed.

During rotation of the barrel 10 the chips work their way toward its lower end 14. Hot gases from the burner 12 flow from the lower end 14 to the upper end 16. Fuel combustion occurs partly in the burner and partly in the lower portion 14 of the barrel 10.

Since the lower end 14 of the barrel 10 is at a temperature near the melting point of the chips (e.g. 1,600° F. for some types of bronze chips) and therefore the chips at that temperature would readily oxidize, it is important to prevent the entry of air into the lower end of the barrel. This might normally occur by aspiration through the space between the barrel 10 and the burner 12 and because of the updraft through the barrel. To prevent such entry of air, I introduce the fuel mixture into the barrel 10 at a rate which provides sufficient gas expansion to cause emission of combustion products from any openings near the lower end 14 of the barrel 10. The barrel 10, especially when provided with the inserts I have described, offers significant resistance to the flow of gases along the barrel. The result is a pressure in the barrel near the lower end which is greater than the atmospheric pressure. Thus, excess hot gases continuously escape from the lower end of the barrel and thereby prevent entry of air.

As the hot gases move toward the upper end 16 of the barrel they lose heat to the counterflowing chips. Thus a temperature gradient exists through the barrel. At some point along the barrel length (i.e. along the temperature gradient) the chips will have a temperature equal to the maximum temperature at which they will not readily oxidize. For example, for some bronze chips this temperature may be 400° F. Of course, the gas temperature will be higher than the chip temperature at this point. In fact, because a temperature gradient exists from the gas to the center of each chip so long as heat is being transferred to each chip, the surface contaminants will be at a temperature between the gas temperature and the chip temperature. It is at this maximum temperature at which the chips won't radily oxidize that an oxidizing agent, such as air or oxygen, is emitted into the tumbler barrel by tube 60. Such an agent will be swept upwardly in the barrel with the hot and/or burning gases and across those chips which are at or below 400° F. None of the oxidizing agent will contact the hotter chips which are further down the barrel and might readily oxidize. The nozzle 62 shown in FIG. 2 is positioned at this point in the temperature gradient. Most of the adulterants are removed in this section of the barrel. Adulterants not removed in the oxidizing agent section of the barrel are removed as the chips progress to the lower end 14 of the barrel.

The cleaned chips are collected in the hopper 30 as they fall out of the lower end 14 of the barrel 10. The chips are dumped from the hopper 30 into the compacting cylinder 38 while they are still at or near the temperature to which the barrel raised them. While still retaining this heat, they are compressed and compacted into briquettes. A denser briquette is formed with less impact energy, by compacting the chips while they are at such a temperature, then can vbe formed at conventional low temperatures.

The mechanical movements involved in compacting are illustrated in FIG. 3. The chips collect in the hopper 30 which has its bottom sealed, during this collection, by the platform 32. After a suitable time period or when the hopper 30 is sufficiently full, the compacting cylinder 38 is slid along the table 40 by its pneumatic cylinder 42 to the position 38a shown in phantom in FIG. 3. The platform 32 is thereby slid away from the bottom of the hopper 30 and a charge of chips falls into the compacting cylinder 38. The pneumatic cylinder 42 then returns the compacting cylinder 38 to its original position.

The plunger 34 is forced into the compacting cylinder 38 by its pneumatic cylinder 36 to approximately the position 34a to thereby compress the chips, for example, to one tenth their original volume. The plunger 34 may be reciprocated to hammer the chips into a briquette. The force of cylinder 36 is then relieved, the removable panel 41 is removed from the bottom of the compacting cylinder 38 and the briquette is ejected by forcing the plunger 34 to the position 34b. The plunger is then returned to its original position and and new cycle may be begun.

Each of these operations could of course be manually controlled. I prefer, however, to use a control circuit based upon a timer. Each of the above described operations occurs in a time sequence. Sensing switches are provided to sense the position of the various parts during the timing sequence and to prevent a subsequent operation until the previous one is completed. For example, a sensing switch may be provided to sense the return of the compacting cylinder 38 to its original position. The plunger 34 would be rendered inoperable unless this sensing switch indicates that the compacting cylinder 38 is properly positioned. A sensing switch 59 is illustrated which indicates the positioning of the compacting cylinder 38 beneath the hopper 30.

As illustrated in FIG. 4, the compacted briquettes might be stored and cooled for eventual future use. Preferably, however, they would be melted immediately in a suitable melting pot 70. From the melting pot, the metal would be conventionally treated, for example, by being cast into an ingot in a mold 72.

Figure 5:
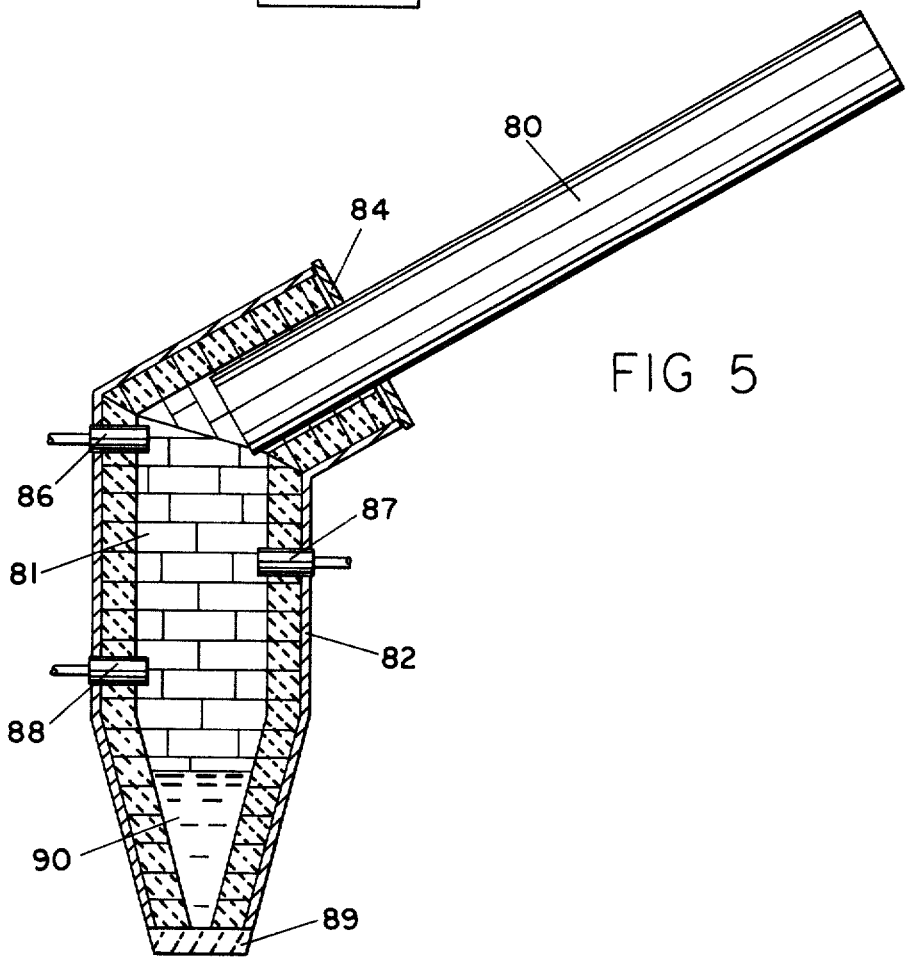
FIG. 5 is a view in vertical section illustrating an alternative embodiment of my invention.

FIG. 4 shows an alternate path 74 indicating that the hot chips can be taken directly from the tumbler barrel 10 to the melting pot 70. In FIG. 5 I illustrate somewhat diagrammatically an alternative embodiment of my invention for accomplishing this.

In FIG. 5, a tumbler barrel 80 is provided which is constructed, supported and driven similarly to the tumbler barrel illustrated in FIG. 1. The barrel 80 fits partly within a conforming portion of a refractory (81) lined melting pot 82. An annular flange 84 seats against the pot 82 to reduce heat loss. The melting pot 82 is provided with a plurality of burner tubes 86, 87 and 88 extending through the walls and each having a fuel supply conduit. The burner tube 86 is positioned to provide primarily heat for passage up through the barrel 80. As the chips fall from the barrel 80, burner 87 and 88 raise their temperature the additional amount necessary to melt them. For example, the barrel might raise some types of bronze chips to 1,600° F. during cleaning. The burners 87 and 88 would raise them an additional 200° F. to a melting point of 1,800° F. A suitable closure 89 is provided to permit release of the melt 90 from the pot 82.

It is to be understood that while the detailed drawings and specific examples given describe preferred embodiments of my invention, they are for the purposes of illustration only, that the apparatus of the invention is not limited to the precise details and conditions disclosed and that various changes may be made therein without departing from the spirit of the invention which is defined by the following claims.

I claim:

1. An apparatus for reclaiming metal from adulterated metal chips by removing surface adhering adulterants from the chips, the apparatus comprising:

a. an inclined tumbler barrel rotatably mounted to a frame *and having its lower end open;* b. means for rotatably driving the barrel;

c. heating means for heating and injecting gas into the lower end of the barrel;

d. exit means at the lower end of the barrel for removing hot chips from the barrel *comprising a non-rotatable cylindrical tube, having an opening in its under side, and aligned with the open lower end of the tumbler barrel and an open-ended hopper aligned with the opening in the under side of the cylindrical tube*; and e. means comprising a [plunger and a] *moveable* mating compacting [cylinder, for compacting said hot chips and positioned to] *box having an open top and at times movable into alignment with the lower open end of said hopper and so become positioned to* receive the hot chips from the exit means;

wherein adulterated chips may be inserted in the upper end of the barrel while being drivingly rotated, hot gas may be passed from the lower end of the barrel to and out the higher end, and hot metal chips relatively free of surface adhering adulterants may be withdrawn through the exit means; and wherein a removable bottom panel is provided to close the bottom of the compacting [cylinder] *box*, an open top is provided to receive chips, and the plunger is provided with drive means for linear axial movement of the plunger into the [cylinder] *box*, wherein chips may be inserted in the [cylinder] *box*, compressed between the plunger and the bottom panel, and ejected from the cylinder by removal of the bottom panel and movement of the plunger.

2. An apparatus according to claim 1, wherein a. the exit means comprises a hopper for receiving chips from the barrel, the hopper being provided with an open bottom;

b. a table is provided which the cylinder sealingly and slidably engages to close its bottom end; and c. a platform is fixed to and extends from the top edge of the cylinder and is sealingly slidably engageable with the bottom of the hopper;

wherein the cylinder is alternatively positionable (1) with said platform sealingly engaging the bottom of the hopper and the bottom of cylinder closed by said table, (2) with the bottom of the cylinder sealingly engaged by the table and the cylinder beneath the bottom opening of the hopper for receiving chips therefrom; and (3) with said platform sealingly engaging the bottom of the hopper and the table removed from engagement with the bottom of the cylinder.

3. An apparatus according to claim 2, wherein the table has a removable panel for opening the bottom of the cylinder.

4. An apparatus according to claim 3 wherein the table, the platform and the open bottom of the hopper are planar and parallel.

5. An apparatus according to claim 3, wherein the barrel is lined with a plurality of refractory inserts each insert comprising a solid body having an exterior formed to snugly fit within the tumbler barrel and each insert having a passageway therethrough comprising cylindrical contiguous, connecting passages of different diameters and wherein the heating means comprises:

a. a source of fuel under pressure, b. means for supplying fuel to the burner at a rate which causes gas to be emitted from the space between the burner and the barrel and prevents the aspiration of air through said space, the means comprising a gas burner positioned at the lower end of the barrel and spaced therefrom, the burner having a sufficiently large nozzle orifice.

6. An apparatus according to claim 5, wherein conduit means, for inserting an oxidizing agent into the barrel at a position intermediate its ends, is provided, said conduit means extending into one end of the barrel, having an outlet orifice within the barrel and there is also provided means external of the barrel for connection to a supply of said agent.

[7. An apparatus for reclaiming metal from adulterated metal chips by removing surface adhering adulterants from the chips, the apparatus comprising:

a. an inclined tumbler barrel rotatably mounted to a frame;

b. means for rotatably driving the barrel;

c. heating means for heating and injecting gas into the lower end of the barrel;

d. exit means at the lower end of the barrel for removing hot chips from the barrel; and e. means in addition to and separate from said heating means for inserting an oxidizing agent into the barrel at a position intermediate its ends wherein adulterared chips may be inserted in the upper end of the barrel while being drivingly rotated, hot gas may be passed from the lower end of the barrel to and out the higher end, and hot metal chips relatively free of surface adhering adulterants may be withdrawn through the exit means.]

[8. An apparatus according to claim 7 wherein said oxidizing agent inserting means comprises a tube entirely separate from any burner tube extending into one end of the barrel, the tube having an outlet orifice within the barrel and having means external to the barrel for connection solely to a supply of said oxidizing agent.]

[9. An apparatus for reclaiming metal from adulterated metal chips by removing surface adhering adulterants from the chips, the apparatus comprising:

a. an inclined tumbler barrel rotatably mounted to a frame and lined with a plurality of generally cylindrical refractory inserts;

b. means for rotatably driving the barrel;

c. heating means for heating and injecting gas into the lower end of the barrel; and d. exit means at the lower end of the barrel for removing hot chips from the barrel;

wherein adulterated chips may be inserted in the upper end of the barrel while being drivingly rotated, hot gas may be passed from the lower end of the barrel to and out the higher end, and hot metal chips relatively free of surface adhering adulterants may be withdrawn through the exit means.]

10. An apparatus [according to claim 9] *for reclaiming metal from adulterated metal chips by removing surface adhering adulterants from the chips, the apparatus comprising:*

*a. an inclined tumbler barrel rotatably mounted to a frame and lined with a plurality fo generally cylindrical refractory inserts;*

*b. means for rotatably driving the barrel;*

*c. heating means for heating and injecting gas into the lower end of the barrel; and*

*d. exit means at the lower end of the barrel for removing hot chips from the barrel;*

*wherein adulterated chips may be inserted in the upper end of the barrel while being drivingly rotated, hot gas may be passed from the lower end of the barrel to and out the higher end, and hot metal chips relatively free of surface adhering adulterants may be withdrawn through the exit means,* wherein each of the inserts comprises a solid body having an exterior formed to snugly fit within the tumbler barrel and having a passageway therethrough comprising a plurality of contiguous connecting passages, the passages being of different diameters.

11. An apparatus according to claim 10 wherein several of said inserts are each additionally provided with an off center passage communicating with the cylindrical passages, the off center passages of the inserts being misaligned to provide a tortuous path through the tumbler barrel.

12. An apparatus according to claim 10, wherein each of the passages is cylindrical and is coaxial with the barrel axis.

13. A rotatable tumbler barrel having an interior for improved distribution of a solid material, flowing through the barrel within an envelope consisting of a counterflow of hot gaseous combustion products flowing through the barrel, the improvement which comprises:

an interior wall formed by a plurality of ceramic inserts forming a passageway through the barrel, the passageway comprising a multiplicity of adjoining passages, the passages being of different diameters and the ceramic inserts each having a plurality of cylindrical interior surfaces, one cylindrical surface of each insert having a different diameter from another cylindrical surface of said insert.

14. A barrel according to claim 13, wherein the passages are cylindrical, contiguous, and connecting, and form a continuous although irregular passageway through the barrel.

15. A barrel according to claim 14, wherein the passages are co-axial, whereby the solid material drops from one diameter to another during its progress through the tumbler barrel.

* * * * *